(12) United States Patent
Beaverson et al.

(10) Patent No.: US 6,619,061 B2
(45) Date of Patent: Sep. 16, 2003

(54) SELF-TUNING PULL-DOWN FUZZY LOGIC TEMPERATURE CONTROL FOR REFRIGERATION SYSTEMS

(75) Inventors: Gregory K. Beaverson, York, PA (US); Wanda J. Miller, Harrisburg, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 10/035,458

(22) Filed: Dec. 26, 2001

(65) Prior Publication Data

US 2003/0115895 A1 Jun. 26, 2003

(51) Int. Cl.[7] .......................... G05B 13/02; F25B 49/00
(52) U.S. Cl. .......................... 62/201; 62/228.5; 700/43; 700/50
(58) Field of Search .................... 62/228.5, 201; 700/43, 50

(56) References Cited

U.S. PATENT DOCUMENTS

| | | | |
|---|---|---|---|
| 5,156,013 A | 10/1992 | Arima et al. | 236/78 D |
| 5,222,370 A * | 6/1993 | James | 62/175 |
| 5,259,210 A | 11/1993 | Ohya et al. | 62/212 |
| 5,419,146 A | 5/1995 | Sibik et al. | 62/204 |
| 5,440,891 A | 8/1995 | Hindmon, Jr. et al. | 62/228.3 |
| 5,502,970 A | 4/1996 | Rajendran | 62/115 |
| 5,669,221 A | 9/1997 | LeBleu et al. | 62/92 |
| 5,669,225 A | 9/1997 | Beaverson et al. | 62/201 |
| 5,697,225 A | 12/1997 | Wada | 62/148 |
| 5,734,593 A | 3/1998 | Madni et al. | 62/112 X |
| 5,769,314 A | 6/1998 | Drees et al. | 236/49.3 |
| 5,771,703 A | 6/1998 | Rajendran | 62/204 |
| 5,809,795 A | 9/1998 | Beaverson et al. | 62/218 |
| 5,822,740 A | 10/1998 | Haissig et al. | 706/3 |
| 5,910,158 A | 6/1999 | Park | 62/148 |
| 5,921,099 A | 7/1999 | Lee | 62/228.4 |
| 6,026,650 A | 2/2000 | Beaverson et al. | 62/126 |
| 6,055,820 A | 5/2000 | Jeong et al. | 62/86 |
| 6,344,232 B1 * | 2/2002 | Jones et al. | 427/8 |

\* cited by examiner

*Primary Examiner*—William Wayner
(74) *Attorney, Agent, or Firm*—Brian T. Sattizahn; Carmen Santa Maria; McNee Wallace & Nurick LLC (57) ABSTRACT

A pull-down control algorithm for an HVAC refrigeration system is provided. The control algorithm utilizes a fuzzy logic methodology to automatically adjust a flow of refrigerant in the system during a pull-down to maintain a desired pull-down rate. The desired pull-down rate is decreased proportionately as the temperature of the fluid being pulled down approaches a desired operating setpoint to avoid or minimize any overshoot of the operating setpoint. The desired pull-down rate is obtained by adjusting a rate sensitivity factor used in the control algorithm. When the temperature of the fluid being pulled down is above a predetermined value from the operating setpoint, the control algorithm uses a fuzzy logic methodology to determine a rate sensitivity that results in the desired pull-down rate that approaches the operating setpoint without overshoot.

44 Claims, 6 Drawing Sheets

| $e_n \setminus de_n$ | NL | NS | ZR | PS | PL |
|---|---|---|---|---|---|
| NS | $CL_1$ | $CL_2$ | $CS_3$ | NR | $OS_3$ |
| ZR | $CL_3$ | $CS_2$ | NR | $OS_2$ | $OL_1$ |
| PS | $CS_1$ | NR | $OS_1$ | $OL_2$ | $OL_3$ |

| $e_n \setminus de_n$ | | NL 0.5 | NS 0.5 | ZR 0 | PS 0 | PL 0 |
|---|---|---|---|---|---|---|
| NS | 0 | 0 | 0 | 0 | X | 0 |
| ZR | 0.75 | 0.5 | 0.5 | X | 0 | 0 |
| PS | 0.25 | 0.25 | X | 0 | 0 | 0 |

SELF-TUNING PULL-DOWN FUZZY LOGIC TEMPERATURE CONTROL FOR REFRIGERATION SYSTEMS

BACKGROUND OF THE INVENTION

The present invention relates generally to controlling temperature of a fluid in a refrigeration system. More specifically, the present invention relates to using fuzzy logic to control the rate at which the leaving chilled water temperature of a chiller is pulled down to a predetermined set point while minimizing overshoot of the predetermined setpoint.

In a chilled water system, chilled water is circulated through a building to remove heat from the building. The water in the chilled water system is cooled in an evaporator or chiller using a heat exchanger, wherein the water is cooled by a refrigerant that accepts heat from the water. Chilled water systems are often operated, for optimum efficiency, at temperatures (operating setpoints) within a few degrees of the freezing point of water. In existing chillers, a control system is often programmed to shut down the chiller as soon as the evaporator water temperature decreases to a certain temperature (a cutout point) near or below the freezing point of water to avoid freezing the water tubes and damaging the chiller. For example, a chiller may have an operating setpoint of 35° F. and a cutout point of 34° F.

A difference of only one degree between the operating setpoint and the cutout point in the chiller, generally does not cause problems during normal or steady-state operation of the chiller. However, when the chiller is required during a pull-down to reduce the water temperature from an ambient temperature to the operating setpoint, a one degree difference between the operating setpoint and the cutout point can be problematic. The chiller may be shut-down by the control system during a pull-down, if the water temperature in the chiller overshoots the operating setpoint and reaches the cutout point. To avoid this problem, it is necessary that chiller control systems be programmed to minimize the pull-down overshoot without sacrificing the pull-down response time.

In standard proportional-integral-derivative (PID) controls, the derivative term controls the rate of approach to the temperature setpoint and is manually tuned and then fixed to achieve a desired maximum overshoot/undershoot for worst case conditions. However, as system dynamics change due to load variations, etc., the response time may become too slow under certain conditions due to the fixed derivative (rate) term. One way to avoid the problems associated with the fixed derivative term is to use a self-tuning control which automatically adjusts the rate term to maintain the desired response time while keeping overshoot/undershoot within acceptable limits. These self-tuning algorithms require knowledge of the amount of undershoot/overshoot before making appropriate adjustments to compensate the control. However, these algorithms may result in the chiller shutting down during the initial and subsequent pull-downs, since the control has not yet completely compensated for the initial overshoots.

Therefore, what is needed is a fuzzy logic control algorithm that can maintain a desired pull-down response time and minimize or eliminate overshoot of an operating setpoint by adjusting a rate sensitivity coefficient of the control algorithm during a mode of pull-down operation that is commenced when the water temperature reaches a few degrees above the operating setpoint.

SUMMARY OF THE INVENTION

One embodiment of the present invention is directed to a temperature control system for a refrigeration system. The refrigeration system comprises a compressor, a condenser, and an evaporator all connected in a closed refrigeration circuit. The compressor has a plurality of inlet guides vanes that are adjustable and controlled by an actuator. The temperature control system includes a sensor for detecting the temperature of the leaving fluid in the evaporator and for providing a temperature signal. The temperature control system also includes a microprocessor that samples the temperature signal at a predetermined interval during a pull-down operation on the leaving fluid temperature in the evaporator. The microprocessor then generates a control signal for the actuator by applying the temperature signal to a fuzzy logic control algorithm configured to minimize or eliminate overshoot of a setpoint temperature of the leaving fluid temperature of the evaporator during the pull-down operation.

Another embodiment of the present invention is directed to a method of calculating a control signal to control flow of refrigerant in a refrigeration system during an operation to adjust the temperature of a secondary refrigerant in the refrigeration system to a predetermined setpoint temperature. The method includes the step of generating a temperature signal for the secondary refrigerant in the refrigeration system. An error signal is generated using the temperature signal and a rate signal is generated using the error signal. A control signal is generated using fuzzy logic reasoning in response to the error signal, the rate signal and a rate sensitivity signal to control the flow of refrigerant in the refrigeration system. Finally, the flow of refrigerant in the refrigeration system is controlled to adjust the temperature of the secondary refrigerant in the refrigeration system to minimize or eliminate overshoot of the predetermined setpoint temperature in response to the control signal.

Yet another embodiment of the present invention is directed to a method of calculating a control signal for an actuator of a plurality of vanes to control flow of refrigerant from an evaporator during a pull-down operation to adjust a temperature of leaving water from the evaporator to a predetermined setpoint temperature. The method comprises the steps of measuring, at predetermined intervals, a temperature of the leaving water from the evaporator. An error value is calculated from the difference between the measured temperature and the predetermined setpoint temperature and a pull-down rate value is calculated from a difference between the error value and a previously calculated error value from the prior interval. Next, a control signal is generated at each predetermined interval using a fuzzy logic control algorithm in response to the error value, the pull-down rate value and an adjustable rate sensitivity value. Finally, the actuator is operated in response to the control signal to position the plurality of vanes to control flow of refrigerant from the evaporator to minimize or eliminate overshoot of the predetermined setpoint temperature during adjustment of the temperature of the leaving water from the evaporator to the predetermined setpoint temperature.

Still another embodiment of the present invention is directed to a refrigeration system comprising a compressor, a condenser, and an evaporator connected in a closed refrigeration circuit. A refrigerant is circulated through the refrigeration circuit. Furthermore, the compressor has a plurality of inlet guides vanes adjustable by an actuator. The refrigeration system also includes a sensor for detecting a leaving fluid temperature from the evaporator to provide a temperature signal and a microprocessor generating an error signal, an error rate of change signal and an adjustable rate sensitivity signal at a predetermined interval during a pull-down operation on the leaving fluid temperature in the evaporator in response to receiving the temperature signal. The microprocessor also generates a control signal for the actuator of the plurality of inlet guide vanes using a fuzzy logic control algorithm. The fuzzy logic control algorithm has the error signal, the error rate of change signal and the adjustable rate sensitivity signal as inputs. The control signal is used to control refrigerant flow from the evaporator to minimize or eliminate overshoot of a setpoint temperature for the leaving fluid temperature of the evaporator during the pull-down operation.

A further embodiment of the present invention is directed to computer program product embodied on a computer readable medium and executable by a microprocessor for calculating a control signal for an actuator of a plurality of vanes to control flow of refrigerant from an evaporator during a pull-down operation to adjust a temperature of leaving water from the evaporator to a predetermined setpoint temperature. The computer program product comprising computer instructions for executing the steps of measuring, at predetermined intervals, a temperature of the leaving water from the evaporator. The computer program product also comprises computer instructions for executing the steps of calculating an error value from the difference between the measured temperature and the predetermined setpoint temperature, calculating a rate value from a difference between the error value and a previously calculated error value from a prior interval, and calculating an adjustable rate sensitivity value using a fuzzy logic algorithm. In addition, the computer program product comprises computer instructions for executing the step of generating a control signal at each predetermined interval using a fuzzy logic control algorithm in response to the error value, the rate value and the adjustable rate sensitivity value. The control signal, when transmitted to the actuator, operates the actuator to position the plurality of vanes to control flow of refrigerant from the evaporator to minimize or eliminate overshoot of the predetermined setpoint temperature during adjustment of the temperature of the leaving water from the evaporator to the predetermined setpoint temperature.

One advantage of the present invention is that a control algorithm is used to minimize or eliminate pull-down overshoot without sacrificing response time.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

Figure 1:
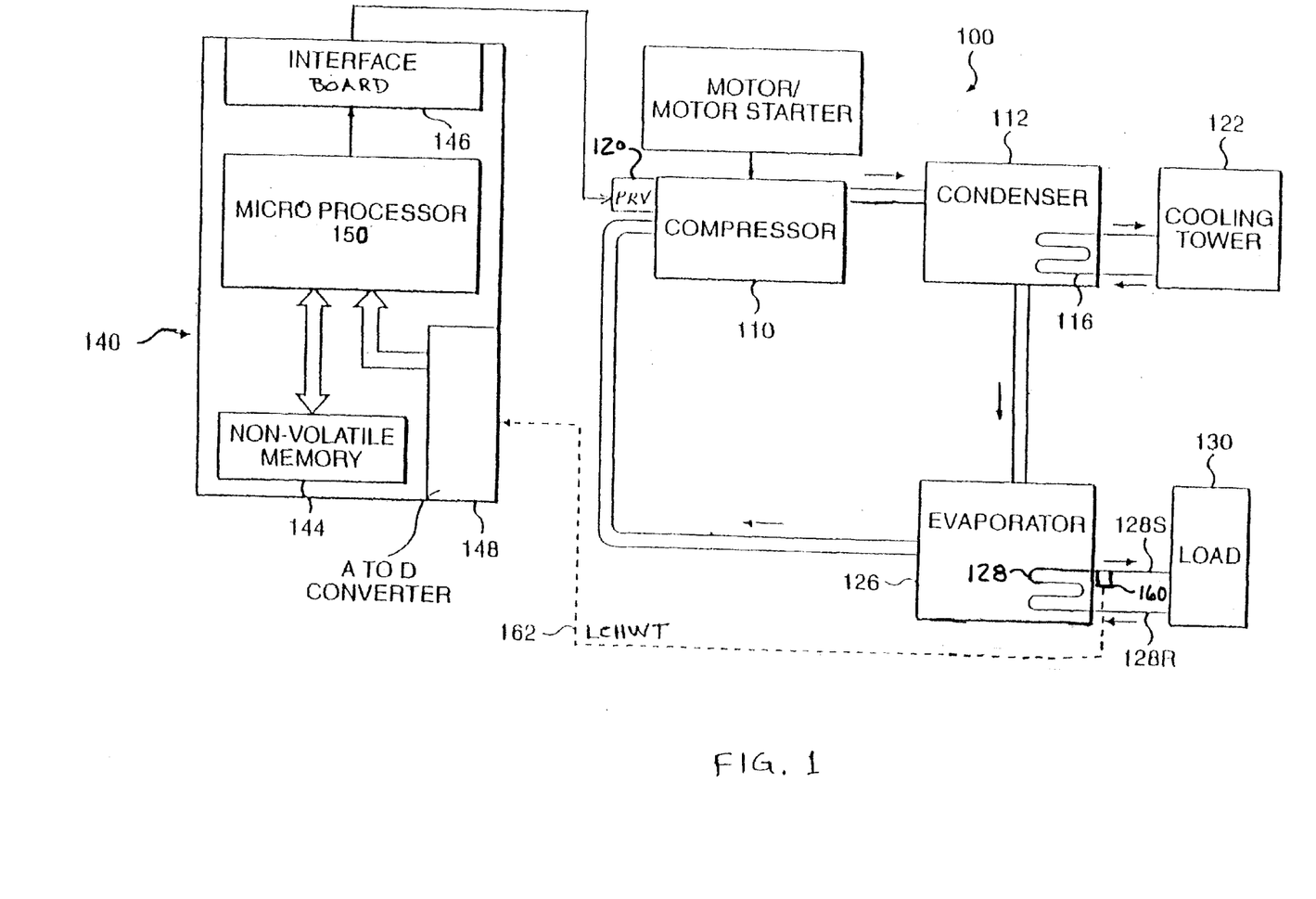
FIG. 1 illustrates schematically a refrigeration system of the present invention.

A general system to which the invention is applied is illustrated, by means of example, in FIG. 1. As shown, the HVAC refrigeration system 100 includes a compressor 110, a condenser 112, a water chiller or evaporator 126, and a control panel 140. The control panel 140 includes an analog to digital (A/D) converter 148, a microprocessor 150, a non-volatile memory 144, and an interface board 146. The operation of the control panel 140 will be discussed in greater detail below. The conventional liquid chiller system includes many other features which are not shown in FIG. 1. These features have been purposely omitted to simplify the drawing for ease of illustration.

The compressor 110 compresses a refrigerant vapor and delivers it to the condenser 112. The compressor 110 is preferably a centrifugal compressor, however other types of compressors can be used such as scroll compressors, reciprocating compressors, and screw compressors. The condenser 112 includes a heat-exchanger coil 116 connected to a cooling tower 122. The condensed liquid refrigerant from condenser 112 flows to an evaporator 126. The evaporator 126 includes, for example, a heat-exchanger coil 128 having a supply line 128S and a return line 128R connected to a cooling load 130. Water or any other suitable secondary refrigerant, e.g. ethylene, calcium chloride brine or sodium chloride brine, travels into the evaporator 126 via return line 128R and exits the evaporator 126 via supply line 128S. The evaporator 126 chills the temperature of the water in the tubes. The heat-exchanger coil 128 can include a plurality of tube bundles. The vapor refrigerant in the evaporator 126 then returns to compressor 110 via a suction line to complete the cycle. At the input to the compressor 110 from the evaporator 126, there are one or more pre-rotation vanes or inlet guide vanes that control the flow of refrigerant to the compressor 110. An actuator 120 is used to open the pre-rotation vanes to increase the amount of refrigerant to the compressor 110 and thereby increase the cooling capacity of the system 100. Similarly, the actuator 120 is used to close the pre-rotation vanes to decrease the amount of refrigerant to the compressor 110 and thereby decrease the cooling capacity of the system 100.

The system 100 includes a sensor 160 for sensing the temperature within the evaporator 126 that corresponds to the leaving chilled water temperature (LCHWT) from the evaporator 126. The sensor 160 is preferably in the refrigerant flow, at the outlet pipe or supply line 128S from the evaporator shell. However, the sensor 160 can be placed in any location that provides an accurate measurement of the LCHWT. The sensor 160 is preferably a temperature thermistor, however, other types of temperature sensors may also be employed. The thermistor provides a resistance that is proportional to the temperature. The resistance from the thermistor is then converted to a voltage signal, using a resistor divider connected to a voltage source or any other suitable technique for generating a voltage. The voltage signal from the sensor 160 is transferred over a line 162 to the control panel 140.

The voltage signal input to control panel 140 over line 162 is converted to a digital signal or word by A/D converter 148. This digital signal representing the evaporator temperature can now be converted by the microprocessor 150 into a corresponding LCHWT. The LCHWT value is then input into the control algorithm, which is described in more detail in the following paragraphs, to generate a control signal for the pre-rotation vane actuator 120. The control signal for the pre-rotation vane actuator 120 is provided to the interface board 146 of the control panel 140. The interface board 146 then provides the control signal to the pre-rotation vane actuator 120 to position the pre-rotation vanes.

Microprocessor 150 uses a fuzzy logic algorithm to control the pre-rotation vane actuator 120 through the interface board 146. In one embodiment, the fuzzy logic algorithm can be a computer program having a series of instructions executable by the microprocessor 150. The control algorithm determines during a pull-down of the LCHWT, whether to cause the pre-rotation vane actuator 120 to further open the pre-rotation vanes, further close the pre-rotation vanes, or maintain the pre-rotation vanes in the same position, thereby regulating the flow of refrigerant vapor and correspondingly the rate that the LCHWT approaches the predetermined operating setpoint temperature.

While it is preferred that the fuzzy logic control algorithm is embodied in a computer program and executed by the microprocessor 150, it is to be understood that the fuzzy logic control algorithm may be implemented and executed using digital and/or analog hardware by those skilled in the art. If hardware is used to execute the fuzzy logic control algorithm, the corresponding configuration of the control panel 140 can be changed to incorporate the necessary components and to remove any components that may no longer be required, e.g. the A/D converter 148.

The fuzzy logic algorithm controls the desired position of the pre-rotation vanes by periodically sampling the LCHWT measured by the sensor 160 at pre-programmed intervals. For example, the programmable intervals may range from 6 to 12 seconds. By sampling the output of the sensor 160 and comparing the sensed values with a predetermined operating setpoint temperature, and with one or more previously stored samples of the LCHWT, the microprocessor 150 can calculate an error value ($e_n$) and the rate of change of the error ($de_n$), according to known computer techniques. The ultimate goal of the fuzzy logic algorithm is to make the error value approach zero so that the operating setpoint temperature is achieved with little or no overshoot that approaches the cut-out point to cause the chiller 126 to shut-down. During each sample interval, the fuzzy logic algorithm of the microprocessor 150 determines the degree of negative, positive and zero membership associated with each input (the error ($e_n$) and its rate of change ($de_n$)) by assigning a weight between zero and one to each input. Then, the fuzzy logic algorithm evaluates several "if then" rules that combine the degrees of membership into the appropriate course of action for the pre-rotation vane actuator 120.

The fuzzy logic algorithm utilizes as variable inputs both a LCHWT error ($e_n$) and the LCHWT error rate of change ($de_n$). The LCHWT error ($e_n$) is calculated as the LCHWT from the sensor 160 minus the predetermined operating setpoint temperature and the LCHWT error rate of change ($de_n$) is the quantity of the present LCHWT error ($e_n$) minus the LCHWT error from the previous sample ($e_{n-1}$) multiplied by the rate sensitivity. The rate sensitivity is a programmable value which ranges from 50–220 and is preferably 140 during steady-state operation. The determination of the rate sensitivity will be provided in greater detail below.

Figure 2:
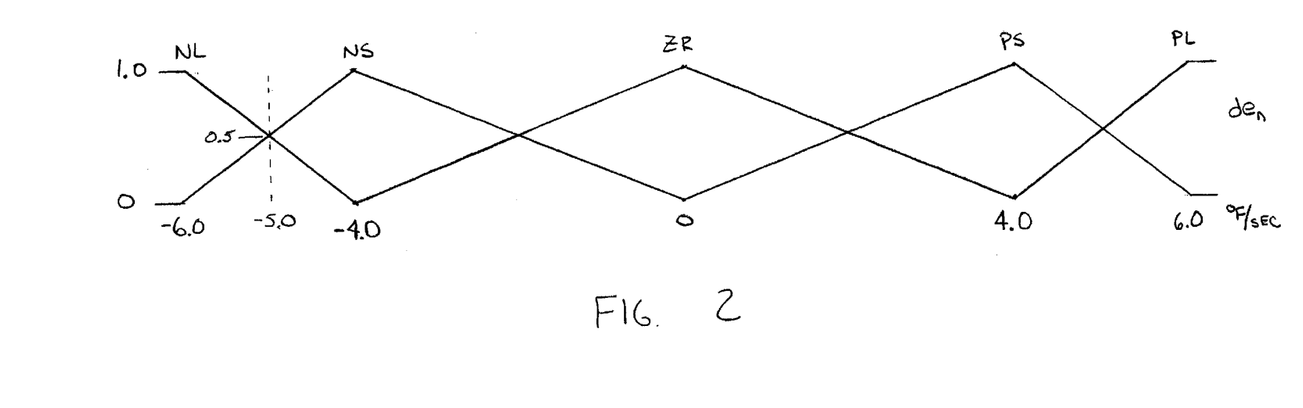
FIGS. 2 and 3 illustrate graphs of membership functions of inputs to the fuzzy logic control algorithm.
Figure 3:
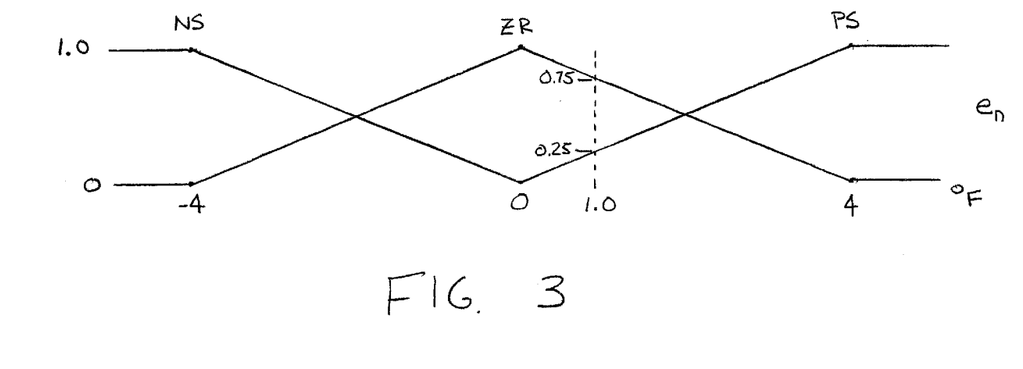

In a preferred embodiment, the fuzzy logic algorithm includes five membership functions for the LCHWT error rate of change ($de_n$) and three membership functions for the LCHWT error ($e_n$). FIG. 2 illustrates the membership functions for the LCHWT error rate of change ($de_n$) and FIG. 3 illustrates the membership functions for the LCHWT error ($e_n$). Each membership function determines in a linear fashion the degree to which the given input is zero, positive or negative. Full membership corresponds to a value of 1.0, partial membership corresponds to a value between 0 and 1.0 and no membership corresponds to a value of 0. The LCHWT error ($e_n$) membership functions are described by three linguistic variables Negative Small (NS), Zero (ZR) and Positive Small (PS). The LCHWT error rate of change ($de_n$) membership functions also include the linguistic variables Negative Large (NL) and Positive Large (PL) in addition to the three linguistic variables Negative Small (NS), Zero (ZR) and Positive Small (PS).

The membership functions shown in FIGS. 2 and 3 are symmetric about zero and reflect the same degree of membership for negative values as positive values when considering inputs of equal magnitude. In general, membership functions may or may not be symmetric. The membership functions are independently programmable and may be changed in the microprocessor 150. Thus, the sensitivity of both the LCHWT error ($e_n$) and the LCHWT error rate of change ($de_n$) membership functions may be modified, both symmetrically and asymmetrically, as desired, to optimize the system control. It is preferred to have programmable membership functions in order to have the flexibility to tune the control. A user can then change the membership functions applied by the fuzzy logic algorithm to obtain a desired system response. However, the membership functions may also be predetermined and non-programmable to provide the user with a simpler and easier to use control arrangement.

Figure 4:
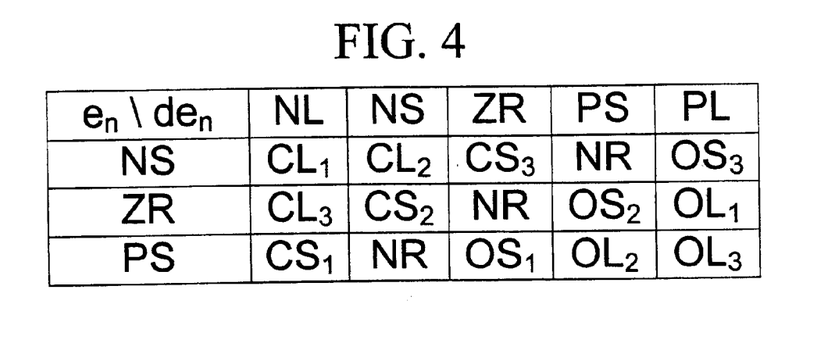
FIG. 4 illustrates a fuzzy logic truth table of the fuzzy logic control algorithm.

The table shown in FIG. 4 shows a fuzzy logic truth table which diagrams how the microprocessor 150 evaluates the fuzzy logic rules according to one embodiment of the present invention. The fuzzy logic rules can be evaluated to one of five output linguistic variables Close Large (CL), Close Small (CS), No Response (NR), Open Small (OS) and Open Large (OL). The output linguistic variables in the truth table are shown with numbered subscripts to distinguish them for illustration purposes.

As shown in the table, the rule combinations, described in the format of $de_n$ membership function, en membership function, are as follows: (Negative Large (NL), Negative Small (NS)), (Negative Small (NS), Negative Small (NS)), and (Negative Large (NL), Zero (ZR)) result in a Close Large (CL) output variable and contribute to a close command for the pre-rotation vane actuator 120 to reduce the cooling capacity of the chiller 126; (Negative Large (NL), Positive Small (PS)), (Negative Small (NS), Zero (ZR)), and (Zero (ZR), Negative Small (NS)) result in a Close Small (CS) output variable and contribute to a close command for the pre-rotation vane actuator 120 to reduce the cooling capacity of the chiller 126; (Positive Large (PL), Zero (ZR)), (Positive Small (PS), Positive Small (PS)), and (Positive Large (PL), Positive Small (PS)) result in a Open Large (OL) output variable and contribute to a open command for the pre-rotation vane actuator 120 to increase the cooling capacity of the chiller 126; and (Positive Small (PS), Zero (ZR)), (Zero (ZR), Positive Small (PS)), and (Positive Large (PL), Negative Small (NS)) result in a Open Small (OS) output variable and contribute to a open command for the pre-rotation vane actuator 120 to increase the cooling capacity of the chiller 126. The remaining three rule combinations are not evaluated since they result in no action or no response. Therefore, a total of twelve rule combinations are evaluated utilizing a fuzzy inference minimum/maximum method. This method implies that a minimum "fuzzy AND" inferencing will be performed first for each of the twelve rule combinations. Then a "fuzzy OR" inferencing will be performed in which the maximum value is found for the three rule combinations that result in the Close Large (CL) output variable contribution and similarly for the Close Small (CS) output variable contribution, as well as for the three rule combinations that result in the Open Large (OL) output variable contribution and similarly for the Open Small (OS) output variable contribution, thus resulting in four maximum values representing resultant open and closed values. The equations for determining the contribution of each output variable are provided below.

$$CL=MAX\ (CL_1, CL_2, CL_3) \quad (1)$$

$$CS=MAX\ (CS_1, CS_2, CS_3) \quad (2)$$

$$OS=MAX\ (OS_1, OS_2, OS_3) \quad (3)$$

$$OL=MAX\ (OL_1, OL_2, OL_3) \quad (4)$$

The resulting four maximum values need to be combined into a single output response, i.e., they need to be "de-fuzzified". Since the centroid method of de-fuzzification is more computationally intensive than required for this application, the singleton approach is preferably used. In the singleton approach, each of the output contributions, i.e. the maximum value of the Close Large (CL) output variable, the Close Small (CS) output variable, the Open Large (OL) output variable and the Open Small (OS) output variable, are each multiplied by a weighting or scaling factor. Preferably, the scaling factor is 6 for the Close Large (CL) output variable and the Open Large (OL) output variable and 3.5 for the Close Small (CS) output variable and the Open Small (OS) output variable, although different scaling factors can be used. Next, the single output response is determined by subtracting the scaled close contribution maximum values from the scaled open contribution maximum values and then multiplying the subtraction result by a pulse factor. The equation for determining the output response or output pulse width (OPW) is provided below.

$$OPW=[(6*OL)+(3.5*OS)-(3.5*CS)-(6*CL)]*\ Pulse\_Factor \quad (5)$$

The Pulse_Factor multiplier is a programmable value that may range from 0.3 to 1.0. The selection of the Pulse_Factor multiplier permits a user to further tune the system response by enabling a pulsewidth adjustment to the output response. A larger value for the Pulse_Factor multiplier results in a more sensitive system response and a smaller value for the Pulse_Factor multiplier results in a less sensitive system response.

If the resultant value is less than zero, the pre-rotation vane actuator 120 receives a pulse width on the close signal (negative value) of equal value in seconds to the resultant value for that sample period. If the resultant value is positive, the pre-rotation vane actuator 120 receives a pulse width on the open signal (positive value) of equal value in seconds to the resultant value for that sample period. An error deadband of approximately ±0.2° F. results in no response to either the open or close signal.

Figure 5:
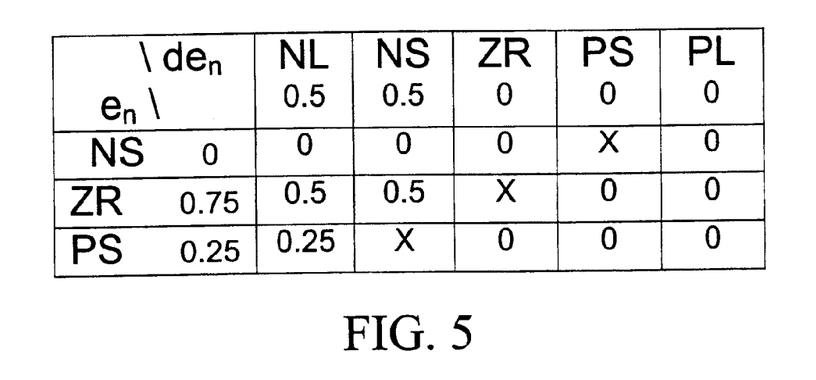
FIG. 5 illustrates a fuzzy logic truth table from one example of the present invention.

The fuzzy inferencing of the present invention will be further clarified by the following example, which is intended to be purely exemplary of the invention. For this example, the LCHWT error ($e_n$) is 1° F., which, recall from above, is calculated as the LCHWT from the sensor 160 minus the predetermined operating setpoint temperature, and the LCHWT error rate of change ($de_n$) is −5° F./sec., which, recall from above, is the quantity of the present LCHWT error ($e_n$) minus the LCHWT error from the previous sample ($e_{n-1}$) multiplied by the rate sensitivity. As shown in FIG. 2, the LCHWT error rate of change ($de_n$) of −5° F./sec., yields degrees of membership of 0.5 to NL and 0.5 to NS. As shown in FIG. 3, the LCHWT error ($e_n$) of 1° F. yields degrees of membership of 0.75 to ZR and 0.25 to PS. The rules are combined by the minimum method and shown in the fuzzy logic truth table of FIG. 5. A comparison is made between the top and left side membership values of the truth table and the minimum value is placed in its respective place in the output section of the truth table. For example, the degree of membership assigned to the NL membership function of $de_n$ (0.5) is combined with the degree of membership assigned to the PS membership function of $e_n$ (0.25) by performing a minimum fuzzy inferencing, i.e., a fuzzy AND routine, and results in a minimum value of 0.25 being assigned to $CS_1$. Next, the results of the combinations or fuzzy AND routines are combined using maximum fuzzy inferencing is performed, i.e., a fuzzy OR routine, as provided below in equations (6)–(9), which results in CS=0.5, CL=0.5, OS=0 and OL=0.

$$CL=MAX\ (0,0,0.5)=0.5 \quad (6)$$

$$CS\ MAX\ (0.25,0.5,0)=0.5 \quad (7)$$

$$OS=MAX\ (0,0,0)=0 \quad (8)$$

$$OL=MAX\ (0,0,0)=0 \quad (9)$$

These results are then defuzzified using equation (5) discussed above and a Pulse_Factor of 1 to obtain an output response or pulse width of −4.75. This output results in a 4.75 second pulse width on the close signal being executed during the current period. In other words, the output response is calculated and executed during the current sample interval and before the next sampling event.

To achieve a smooth approach to the operating setpoint with little or no overshoot, the rate sensitivity term is adjusted during a temperature pull-down situation. The rate sensitivity term is adjusted based on the pull-down rate ($dT=e_n-e_{n-1}$) at which the LCHWT is approaching the predetermined operating setpoint and the difference between the predetermined operating setpoint and the LCHWT or the LCHWT error ($e_n$). When the LCHWT equals or is greater than a preselected value (preferably 6° F., but other values can be used) above the predetermined operating setpoint, i.e. the LCHWT error ($e_n$) equals or is greater than the preselected value, the control algorithm operates in a "pull-down mode" of operation instead of in a steadystate mode of operation. In the pull-down mode of operation, the sampling period is automatically set to the minimum sampling period, which is preferably 6 seconds, and the rate sensitivity is calculated based on the pull-down LCHWT rate (dT). The pull-down or self-tuning mode of operation is preferably concluded when the LCHWT error ($e_n$) becomes negative and then becomes positive again or two minutes after the LCHWT has reached a value that is within 0.5° F. of the predetermined operating setpoint, i.e. the LCHWT error ($e_n$) <=0.5, however, other determinations for concluding the pull-down mode can be used. When the pull-down mode of operation is concluded the rate sensitivity and the sampling period are automatically returned to their normal programmed values for steady state control operation.

Figure 6:
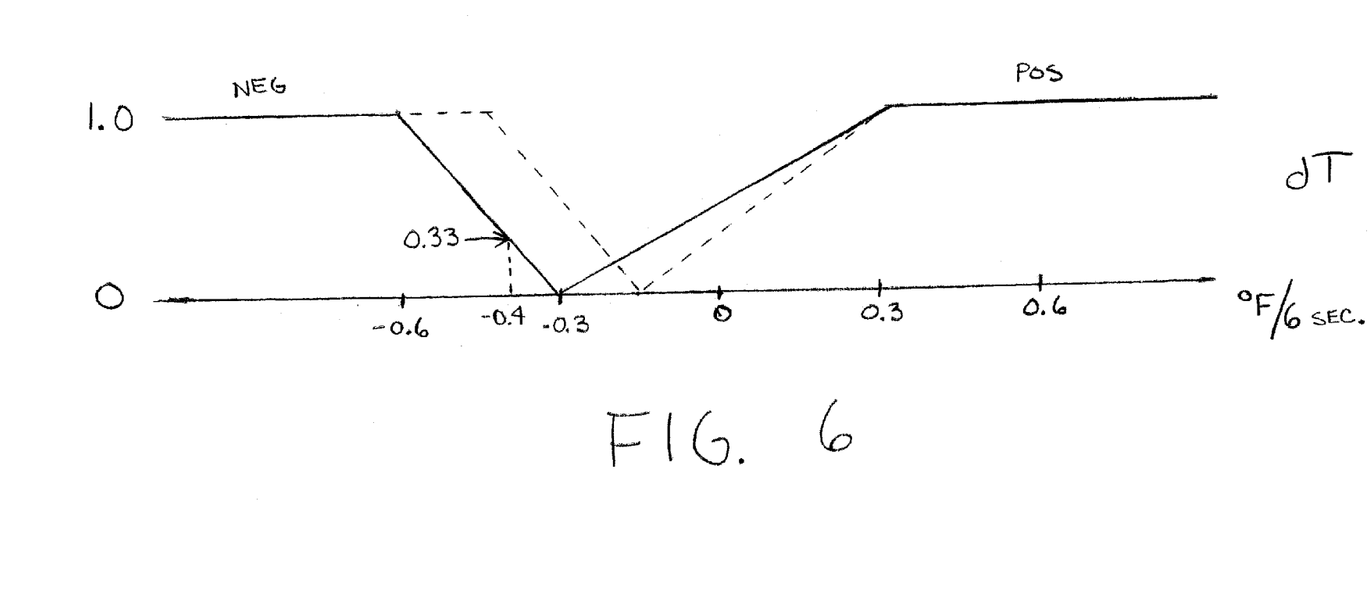
FIG. 6 illustrates a graph of the membership function for a fuzzy logic system for determining rate sensitivity during a pull-down mode of operation.

In the temperature pull-down mode of operation, the rate sensitivity term is determined using fuzzy reasoning. FIG. 6 illustrates the membership functions for the pull-down LCHWT rate (dT). The pull-down LCHWT rate (dT) membership functions are described by two linguistic variables, Negative (NEG) and Positive (POS). Recall from above, that when the pull-down mode is entered the sampling period is set to 6 seconds, thus the values of dT illustrated in FIG. 6 are based on a sample period of 6 seconds, i.e. dT is calculated in degrees Fahrenheit per 6 seconds (° F./(6 sec.)). The membership functions for the pull-down LCHWT rate (dT) are dependent on a target rate, which defines the point that yields 0% membership for both membership functions. The membership functions for the pull-down LCHWT rate (dT) extend from the target rate to upper and lower extremes that yield 100% membership. The target rate is programmable and adjustable, as described in greater detail below. If a pull-down LCHWT rate (dT) is obtained that is less than the target rate (i.e. a negative value), the rate sensitivity will be increased because the pull-down LCHWT rate (dT) is moving too fast and has to be slowed down. In contrast, if a pull-down LCHWT rate (dT) is obtained that is greater than the target rate, the rate sensitivity will be decreased because the pull-down LCHWT rate (dT) is moving too slow and has to be increased.

In a preferred embodiment of the present invention, the target rate is fixed in the pull-down mode at −0.3° F./(6 sec.) or −0.05° F./sec. when the LCHWT error ($e_n$) is greater than 2° F., however other fixed target rates can be used for this temperature range. After the LCHWT error ($e_n$) reaches 2° F. or less in the pull-down mode, the target rate is decreased linearly as the LCHWT error ($e_n$) approaches zero to slow the rate of approach so that minimal to zero overshoot of the predetermined setpoint is achieved, however, other function types for decreasing the target rate can also be used. FIG. 6 illustrates the membership functions for the pull-down LCHWT rate (dT) for a LCHWT error ($e_n$) greater than 2° F. (solid lines) and for a LCHWT error ($e_n$) between 0 and 2° F. (dashed lines).

The fuzzy inferencing of the present invention will be further clarified by another example, which is intended to be purely exemplary of the invention. For this example, the pull-down LCHWT rate (dT) is −0.4° F./(6 sec.), the LCHWT error ($e_n$) is greater than 2° F. and the target rate is −0.3° F./(6 sec.) As shown in FIG. 6, the pull-down LCHWT rate (dT) of −0.4° F./(6 sec.) yields degrees of membership of 0.33 to NEG and 0.0 to POS. The rate sensitivity is then determined from the following equation provided below.

$$\text{rate\_sensitivity} = 140 + (NEG*110) - (POS*90) \quad (10)$$

Solving equation (10) with degrees of membership of 0.33 to NEG and 0.0 to POS yields a rate sensitivity of 176 as shown below in equation (11).

$$\text{rate\_sensitivity} = 140 + (0.33*110) - (0*90) = 176 \quad (11)$$

Figure 7A:
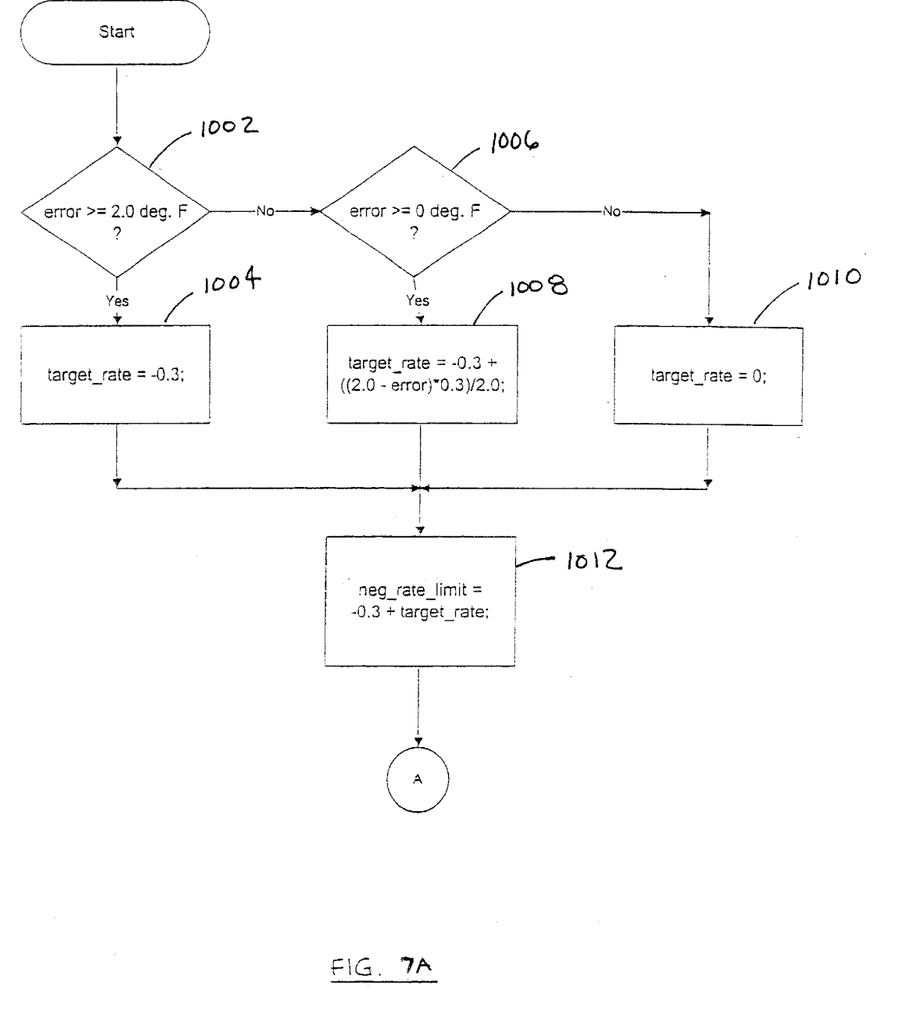
FIGS. 7A and 7B illustrate a flow chart of the process for determining the rate sensitivity during the pull-down mode of operation.
Figure 7B:
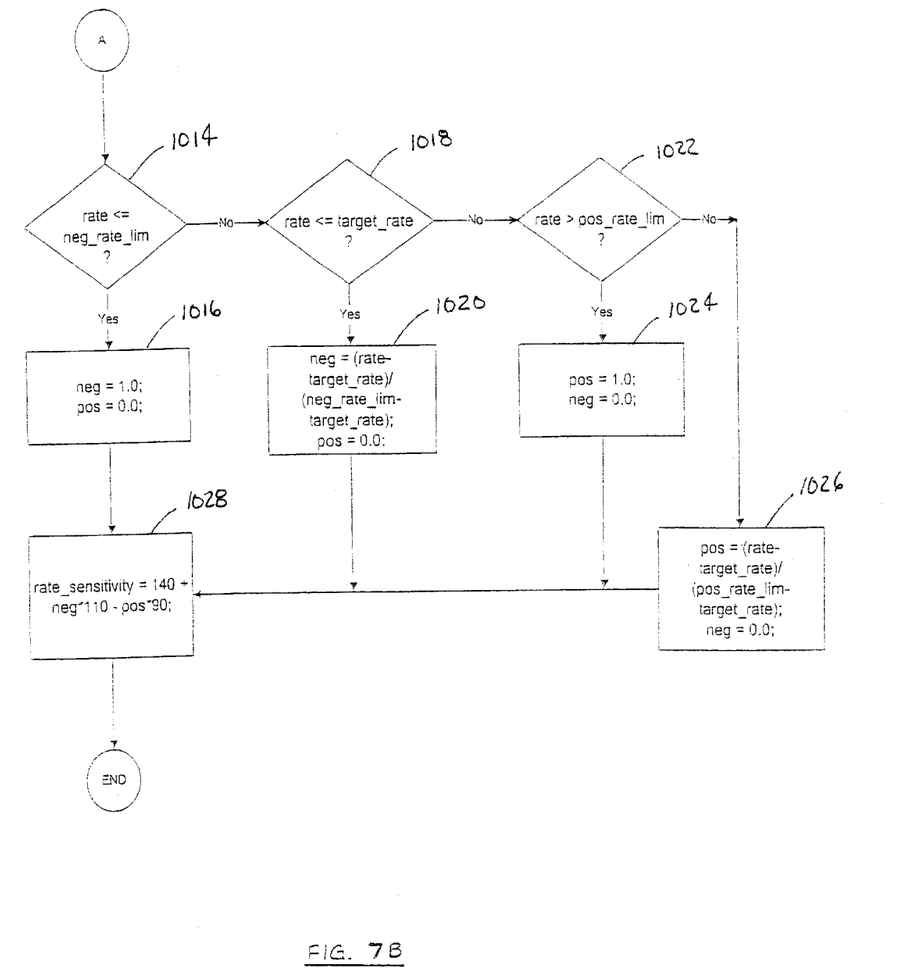

FIGS. 7A and 7B illustrate a flow chart of the process for determining the rate sensitivity in the pull-down mode of operation. The process begins in step 1002, where the LCHWT error ($e_n$) is checked to see if it is greater than or equal to 2 ° F. If the LCHWT error ($e_n$) is greater than or equal to 2° F. then the target rate is set to −0.3° F./(6 sec.) in step 1004. If the LCHWT error ($e_n$) is less than 2° F., then the LCHWT error ($e_n$)) is checked to see if it is greater than or equal to 0° F. in step 1006. If the LCHWT error ($e_n$) is greater than or equal to 0° F., then the target rate is determined in step 1008 using the equation provided below.

$$\text{target\_rate} = -0.3 + (((2.0 - \text{error } (e_n))*0.3)/2.0) \quad (12)$$

If the LCHWT error ($e_n$) is less than 0° F., then the target rate is set to 0 ° F./(6 sec.) in step 1010. Next, after the target rate has been determined in steps 1004, 1008, 1010, the negative rate limit is determined in step 1012 using the equation provided below.

$$\text{neg\_rate\_lim} = -0.3 + \text{target\_rate} \quad (13)$$

In step 1014, the pull-down LCHWT rate (dT) is checked to see if it is less than or equal to the negative rate limit. If the pull-down LCHWT rate (dT) is less than the negative rate limit, then the degree of membership for the Negative membership function is set to 1.0 and the degree of membership for the Positive membership function is set to 0.0 in step 1016. In step 1018, the pull-down LCHWT rate (dT) is checked to see if it is less than or equal to the target rate. If the pull-down LCHWT rate (dT) is less than or equal to the target rate, then the degree of membership of the Negative membership function is determined in step 1020 using the equation provided below.

$$NEG = (\text{rate}(dT) - \text{target\_rate})/(\text{neg\_rate\_lim} - \text{target\_rate}) \quad (14)$$

Also in step 1020, the degree of membership for the Positive membership function is set to 0.0. In step 1022, the pull-down LCHWT rate (dT) is checked to see if it is greater than the positive rate limit. If the pull-down LCHWT rate (dT) is greater than the positive rate limit, then the degree of membership for the Positive membership function is set to 1.0 and the degree of membership for the Negative membership function is set to 0.0 in step 1024. If the pull-down LCHWT rate (dT) is less than the positive rate limit, then the degree of membership of the Positive membership function is determined in step 1026 using the equation provided below.

$$POS = (\text{rate}(dT) - \text{target\_rate})/(\text{pos\_rate\_lim} - \text{target\_rate}) \quad (15)$$

Also in step 1026, the degree of membership for the Negative membership function is set to 0.0. Finally, after the degrees of membership have been determined in steps 1016, 1020, 1024 and 1026, the rate sensitivity is calculated in step 1028 using equation (10) as discussed above. The calculated rate sensitivity is then used in the fuzzy logic methodology described above to calculate a control signal for the pre-rotation vane actuator 120.

The present invention has been described in the context of a control algorithm for a pre-rotation vane actuator that controls the flow of refrigerant from an evaporator and to a compressor in a chiller system, thereby controlling the pull-down rate of the leaving chilled water temperature of the evaporator. However, the control algorithm of the present invention can be used in any type of refrigeration system to control the rate, either pull-down or pull-up, at which the temperature of a fluid in the system is brought to a setpoint. To use the control algorithm in other types of refrigeration systems, some changes may have to be made to the membership functions and the sensor information that is used by the control algorithm to account for the particular configuration of the system to which the control algorithm is being applied.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A temperature control system for a refrigeration system comprising a compressor, a condenser, and an evaporator connected in a closed refrigeration circuit, the compressor having a plurality of inlet guides vanes adjustable by an actuator, the control system comprising:
   a sensor for detecting leaving fluid temperature from the evaporator to provide a temperature signal; and
   a microprocessor sampling the temperature signal at a predetermined interval during a pull-down operation on the leaving fluid temperature in the evaporator and generating a control signal for the actuator by applying the temperature signal to a fuzzy logic control algorithm configured to minimize or eliminate overshoot of a setpoint temperature for the leaving fluid temperature of the evaporator during the pull-down operation.

2. The temperature control system of claim 1 wherein the microprocessor generates an error signal and an error rate of change signal using the temperature signal and an adjustable rate sensitivity signal and applies the error signal and the error rate of change signal to the fuzzy logic control algorithm to generate the control signal.

3. The temperature control system of claim 2 wherein the microprocessor generates a degree of membership for the error rate of change signal in each of a first plurality of membership functions and the microprocessor generates a degree of membership for the error signal in each of a second plurality of membership functions.

4. The temperature control system of claim 3 wherein the microprocessor performs a minimum fuzzy AND inferencing on the determined degrees of membership for the plurality of first membership functions for the error rate of change signal and the determined degrees of membership for the second plurality of membership functions for the error signal and the microprocessor performs a maximum fuzzy OR reasoning on results from the minimum fuzzy AND inferencing to generate at least one contribution for opening the plurality of inlet guide vanes and at least one contribution for closing the plurality of inlet guide vanes.

5. The temperature control system of claim 4 wherein the microprocessor generates the control signal by using at least one contribution for closing the plurality of inlet guide vanes, at least one contribution for opening the plurality of vanes and a pulse factor.

6. The temperature control system of claim 2 wherein the microprocessor adjusts the adjustable rate sensitivity signal using a fuzzy logic algorithm when the error signal reaches a predetermined value.

7. The temperature control system of claim 6 wherein the microprocessor applies the fuzzy logic algorithm to generate a first membership function and a second membership function for a pull-down rate signal using a target rate and the microprocessor determines a degree of membership of the pull-down rate signal in both the first membership function and the second membership function.

8. The temperature control system of claim 7 wherein the microprocessor adjusts the adjustable rate sensitivity signal using the degree of membership for the first membership function, the degree of membership for the second membership function and a base rate sensitivity value.

9. The temperature control system of claim 1 wherein the sensor comprises a thermistor to provide a resistance proportional to the leaving fluid temperature from the evaporator.

10. The temperature control system of claim 9 further comprising:
    means, for converting the resistance from the thermistor to a voltage signal; and
    an analog to digital converter to receive the voltage signal from the means for converting and to convert the voltage signal to a digital word.

11. The temperature control system of claim 10 wherein the microprocessor receives the digital word from the analog to digital converter and converts the digital word to the temperature signal.

12. The temperature control system of claim 1 further comprising an interface to receive the control signal from the microprocessor and to communicate the control signal to the actuator to position the plurality of inlet guide vanes.

13. A method of controlling flow of refrigerant in a refrigeration system during an operation to adjust a temperature of a secondary refrigerant in the refrigeration system to a predetermined setpoint temperature, the method comprising the steps of:
    generating a temperature signal for the secondary refrigerant in the refrigeration system;
    generating an error signal using the temperature signal;
    generating a rate signal using the error signal;
    generating an a control signal using fuzzy logic reasoning in response to the error signal and the rate signal to control the flow of refrigerant in the refrigeration system; and
    controlling the flow of refrigerant in the refrigeration system in response to the control signal to adjust the temperature of the secondary refrigerant in the refrigeration system to minimize or eliminate overshoot of the predetermined setpoint temperature.

14. The method of claim 13 further comprising the step of repeating the steps of generating a temperature signal, generating an error signal, generating a rate signal, generating a control signal and controlling the flow of refrigerant until the temperature of the secondary refrigerant has been adjusted to about the predetermined setpoint temperature.

15. The method of claim 14 wherein the step of repeating further comprises repeating the steps of generating a temperature signal, generating an error signal, generating a rate signal, generating a control signal and controlling the flow of refrigerant at a predetermined. time interval until the temperature of the secondary refrigerant has been adjusted to about the, predetermined setpoint temperature.

16. The method of claim 13 further comprising the step of calculating a rate sensitivity signal using fuzzy logic reasoning in response to the error signal reaching a predetermined value.

17. The method of claim 16 wherein the step of calculating the rate sensitivity signal further comprises the steps of:
    comparing the error signal to a minimum error threshold and a maximum error threshold;
    determining a target rate for adjustment of the temperature of the secondary refrigerant in response to the comparisons of the error signal;
    generating a first membership function and a second membership function for a pull-down rate signal in response to the target rate;
    generating a degree of membership signal in response to the pull-down rate signal for both the first membership function and the second membership function; and
    calculating the rate sensitivity signal in response to the degree of membership signals from both the first membership function and the second membership function.

18. The method of claim 17 wherein the step of calculating the rate sensitivity signal further comprises the steps of:
  generating a first scaled signal by multiplying the degree of membership signal for the first membership function by a first scaling factor;
  generating a second scaled signal by multiplying the degree of membership signal for the second membership function by a second scaling factor; and
  generating the rate sensitivity signal from a sum of a base rate sensitivity and the difference between the first scaled signal and the second scaled signal.

19. The method of claim 16 further comprising the step of:
  generating an error rate of change signal using the error signal and the rate sensitivity signal; and
  the step of generating a control signal further comprises the step of generating a control signal using fuzzy logic reasoning in response to the error signal and the error rate of change signal to control the flow of refrigerant in the refrigeration system.

20. The method of claim 19 wherein the step of generating a control signal using fuzzy logic reasoning in response to the error signal and the error rate of change signal further comprises the steps of:
  generating at least one degree of membership signal for at least one membership function for the error signal; and
  generating at least one degree of membership signal for at least one membership function for the error rate of change signal.

21. The method of claim 20 wherein the step of generating a control signal using fuzzy logic reasoning in response to the error signal and the error rate of change signal further comprises the steps of:
  performing a minimum fuzzy AND inferencing for the at least one degree of membership signal for the at least one error signal membership function and the at least one degree of membership signal for the at least one error rate of change signal membership function; and
  performing a maximum fuzzy OR reasoning to generate at least one first output signal having a maximum value for at least one output membership function providing a contribution to increasing flow of refrigerant in the refrigeration system and to generate at least one second output signal having a maximum value for at least one output membership function providing a contribution to decreasing flow of refrigerant in the refrigeration system.

22. The method of claim 21 wherein the step of generating a control signal using fuzzy logic reasoning in response to the error signal and the error rate of change signal further comprises the steps of:
  multiplying the at least one first output signal by a corresponding scale factor;
  multiplying the at least one second output signal by a corresponding scale factor; and
  subtracting the scaled at least one second output signal from the scaled at least one first output signal to generate a contribution signal.

23. The method of claim 22 wherein the step of generating a control signal using fuzzy logic reasoning in response to the error signal and the error rate of change signal further comprises the step of multiplying the contribution signal by a pulse factor to generate the control signal.

24. The method of claim 13 wherein the step of controlling the flow of refrigerant further comprises the steps of:
  increasing the flow of refrigerant in the refrigeration system in response to a positive control signal; and
  decreasing the flow of refrigerant in the refrigeration system in response to a negative control signal.

25. A method of calculating a control signal for an actuator of a plurality of vanes to control flow of refrigerant from an evaporator during a pull-down operation to adjust a temperature of leaving water from the evaporator to a predetermined setpoint temperature, the method comprising the steps of:
  measuring, at predetermined intervals, a temperature of the leaving water from the evaporator;
  calculating an error value from the difference between the measured temperature and the predetermined setpoint temperature; and
  calculating a pull-down rate value from a difference between the error value and a previously calculated error value from a prior interval;
  generating a control signal at each predetermined interval using a fuzzy logic control algorithm in response to the error value, the pull-down rate value and an adjustable rate sensitivity value, wherein the control signal, when transmitted to the actuator, operates the actuator to position the plurality vanes to control flow of refrigerant from the evaporator to minimize or eliminate overshoot of the predetermined setpoint temperature during adjustmnent of the temperature of the leaving water from the evaporator to the predetermined setpoint temperature.

26. The method of claim 25 further comprising the step of calculating the adjustable rate sensitivity value using a fuzzy logic algorithm.

27. The method of claim 26 wherein the step of calculating the adjustable rate sensitivity value further comprises the step of determining a target rate for adjustment of the temperature of the leaving water from the evaporator to the predetermined setpoint temperature, wherein the target rate has a first predetermined value when the error value is greater than or equal to a first threshold temperature, the target rate has a second predetermined value when the error value is less than or equal to a second threshold temperature and the target rate has a third adjustable value when the error value is between the first threshold temperature and the second threshold temperature.

28. The method of claim 27 wherein the step of calculating the adjustable rate sensitivity value further comprises the steps of:
  generating a first membership function and a second membership function for the pull-down rate value using the target rate, wherein the target rate defines a point that yields a degree of membership of 0 for both the first membership function and the second membership function, the first membership function defines a contribution for increasing the rate sensitivity value and the second membership function defines a contribution for decreasing the rate sensitivity value; and
  determining a degree of membership of the pull-down rate value in both the first membership function and the second membership function.

29. The method of claim 28 wherein the step of calculating the adjustable rate sensitivity value further comprises the steps of:
  multiplying the degree of membership for the first membership function by a first scaling factor;
  multiplying the degree of membership for the second membership function by a second scaling factor; and calculating the adjustable rate sensitivity value by subtracting the scaled degree of membership for the second membership function from the scaled degree of membership for the first membership function and adding the difference to a base rate sensitivity value.

30. The method of claim 26 further comprising the steps of:
calculating an error rate of change value by multiplying the pull-down rate value and the adjustable rate sensitivity value; and
the step of generating a control signal further comprising generating a control signal at each predetermined interval using a fuzzy logic control algorithm in response to the error value and the error rate of change value.

31. The method of claim 30 wherein the step of generating a control signal further comprises the steps of:
determining a degree of membership of the error rate of change value in each of a plurality of membership functions, wherein the plurality of membership functions comprises at least one membership function defining a positive contribution, at least one membership function defining a negative contribution and at least one membership function defining zero contribution; and
determining a degree of membership of the error value in each of a plurality of membership functions, wherein the plurality of membership functions comprises at least one membership function defining a positive contribution at least one membership function defining a negative contribution and at least one membership function defining zero contribution.

32. The method of claim 31 wherein the step of generating a control signal further comprises the step of evaluating a plurality of fuzzy logic rules in response to the determined degrees of membership for the plurality of membership functions for the error rate of change value and the determined degrees of membership for the plurality of membership functions for the error value.

33. The method of claim 32 wherein the step of evaluating a plurality of fuzzy logic rules further comprises the step of applying a fuzzy minimum/maximum algorithm to generate at least one contribution for opening the plurality of vanes and at least one contribution for closing the plurality of vanes, wherein the fuzzy minimum/maximum algorithm comprises the steps of:
performing a minimum fuzzy AND inferencing on the determined degrees of membership for the plurality of membership functions for the error rate of change value and the determined degrees of membership for the plurality of membership functions for the error value; and
performing a maximum fuzzy OR reasoning on results from the minimum fuzzy AND inferencing to generate the at least one contribution for opening the plurality of vanes and the at least one contribution for closing the plurality of vanes.

34. The method of claim 33 wherein the step of generating a control signal further comprises the steps of:
scaling the at least one contribution for opening the plurality of vanes;
scaling the at least one contribution for closing the plurality of vanes; and
generating the control signal by subtracting the scaled at least one contribution for closing the plurality of vanes from the scaled at least one contribution for opening the plurality of vanes and then multiplying by a pulse factor.

35. A refrigeration system comprising:
a compressor, a condenser, and an evaporator connected in a closed refrigeration circuit, through which refrigerant is circulated, the compressor having a plurality of inlet guides vanes adjustable by an actuator;
a sensor for detecting a leaving fluid temperature in the evaporator to provide a temperature signal;
means for generating an error signal, an error rate of change signal and an adjustable rate sensitivity signal at a predetermined interval during a pull-down operation on the leaving fluid temperature in the evaporator in response to receiving the temperature signal; and
means for generating a control signal for the actuator of the plurality of inlet guide vanes in response to the error signal, the error rate of change signal and the adjustable rate sensitivity signal as inputs, to control refrigerant flow to the evaporator to minimize or eliminate overshoot of a setpoint temperature for the leaving fluid temperature of the evaporator during the pull-down operation.

36. A computer program product embodied on a computer readable medium and executable by a microprocessor for calculating a control signal for an actuator of a plurality of vanes to control flow of refrigerant from an evaporator during a pull-down operation to adjust a temperature of leaving water from the evaporator to a predetermined setpoint temperature, the computer program product comprising computer instructions for executing the steps of:
measuring, at predetermined intervals, a temperature of the leaving water from the evaporator;
calculating an error value from the difference between the measured temperature and the predetermined setpoint temperature;
calculating a pull-down rate value from a difference between the error value and a previously calculated error value from a prior interval;
calculating an adjustable rate sensitivity value using a fuzzy logic algorithm; and
generating a control signal at each predetermined interval using a fuzzy logic control algorithm in response to the error value, the pull-down rate value and the adjustable rate sensitivity value, wherein the control signal, when transmitted to the actuator, operates the actuator to position the plurality vanes to control flow of refrigerant from the evaporator to minimize or eliminate overshoot of the predetermined setpoint temperature during adjustment of the temperature of the leaving water from the evaporator to the predetermined setpoint temperature.

37. The computer program product of claim 36 wherein the step of calculating the adjustable rate sensitivity value further comprises the step of determining a target rate for adjustment of the temperature of the leaving water from the evaporator to the predetermined setpoint temperature, wherein the target rate has a first predetermined value when the error value is greater than or equal to a first threshold temperature, the target rate has a second predetermined value when the error value is less than or equal to a second threshold temperature and the target rate has a third adjustable value when the error value is between the first threshold temperature and the second threshold temperature.

38. The computer program product of claim 37 wherein the step of calculating the adjustable rate sensitivity value further comprises the steps of:
generating a first membership function and a second membership function for the pull-down, rate value using the target rate, wherein the target rate defines a point that yields a degree of membership of 0 for both the first membership function and the second membership function, the first membership function defines a contribution for increasing the rate sensitivity value and the second membership function defines a contribution for decreasing the rate sensitivity value; and determining a degree of membership of the pull-down rate value in both the first membership function and the second membership function.

39. The computer program product of claim 38 wherein the step of calculating the adjustable rate sensitivity value further comprises the steps of:

multiplying the degree of membership for the first membership function by a first scaling factor;

multiplying the degree of membership for the second membership function by a second scaling factor; and calculating the adjustable rate sensitivity value by subtracting the scaled degree of membership for the second membership function from the scaled degree of membership for the first membership function and adding the difference to a base rate sensitivity value.

40. The computer program product of claim 36 further comprising computer instructions for executing the step of:

calculating an error rate of change value by multiplying the pull-down rate value and the adjustable rate sensitivity value; and the step of generating a control signal further comprising generating a control signal at each predetermined interval using a fuzzy logic control algorithm in response to the error value and the error rate of change value.

41. The computer program product of claim 40 wherein the step of generating a control signal further comprises the steps of:

determining a degree of membership of the error rate of change value in each of a plurality of membership functions, wherein the plurality of membership functions comprises at least one membership function defining a positive contribution, at least one membership function defining a negative contribution and at least one membership function defining zero contribution; and determining a degree of membership of the error value in each of a plurality of membership functions, wherein the plurality of membership functions comprises at least one membership function defining a positive contribution, at least one membership, function defining a negative contribution and at least one membership function defining zero contribution.

42. The computer program product of claim 41 wherein the step of generating a control signal further comprises the step of evaluating a plurality of fuzzy logic rules in response to the determined degrees of membership for the plurality of membership functions for the error rate of change value and the determined degrees of membership for the plurality of membership functions for the error value.

43. The computer program product of claim 42 wherein the step of evaluating a plurality of fuzzy logic rules further comprises the step of applying a fuzzy minimum/maximum algorithm to generate at least one contribution for opening the plurality of vanes and at least one contribution for closing the plurality of vanes, wherein the fuzzy minimum/maximum algorithm comprises the steps of:

performing a minimum fuzzy AND inferencing on the determined degrees of membership for the plurality of membership functions for the error rate of change value and the determined degrees of membership for the plurality of membership functions for the error value; and performing a maximum fuzzy OR reasoning on results from the minimum fuzzy AND inferencing to generate the at least one contribution for opening the plurality of vanes and the at least one contribution for closing the plurality of vanes.

44. The computer program product of claim 43 wherein the step of generating a control signal further comprises the steps of:

scaling the at least one contribution for opening the plurality of vanes; scaling the at least one contribution for closing the plurality of vanes; and generating the control signal by subtracting the scaled at least one contribution for closing the plurality of vanes from the scaled at least one contribution for opening the plurality of vanes and then multiplying by a pulse factor.

* * * * *

UNITED STATES PATENT AND TRADEMARK OFFICE
CERTIFICATE OF CORRECTION

PATENT NO. : 6,619,061 B2
DATED : September 16, 2003
INVENTOR(S) : Gregory K. Beaverson and Wanda J. Miller It is certified that error appears in the above-identified patent and that said Letters Patent is hereby corrected as shown below:

<u>Title page,</u>
Item [74], *Attorney, Agent, or Firm*, "McNee Wallace" should be -- McNees Wallace --.

<u>Column 6,</u>
Line 44, "en membership" should be -- $e_n$ membership --.

<u>Column 8,</u>
Line 26, "CS MAX" should be -- CS=MAX --.

<u>Column 10,</u>
Line 33, "$pos\_{rate}\_lim\text{-}target\_{rate}$" should be -- $pos\_rate\_lim\text{-}target\_rate$ --.

<u>Column 12,</u>
Line 44, "predetermined. time" should be -- predetermined time --.
Line 46, "the, predetermined" should be -- the predetermined --.

<u>Column 14,</u>
Line 28, "adjustmnent" should be -- adjustment --.

<u>Column 15,</u>
Line 28, "contribution at" should be -- contribution, at --.

<u>Column 16,</u>
Line 67, "pull-down, rate" should be -- pull-down rate --.

UNITED STATES PATENT AND TRADEMARK OFFICE
CERTIFICATE OF CORRECTION

PATENT NO. : 6,619,061 B2
DATED : September 16, 2003
INVENTOR(S) : Gregory K. Beaverson and Wanda J. Miller It is certified that error appears in the above-identified patent and that said Letters Patent is hereby corrected as shown below:

Column 18,
Line 3, "membership, function" should be -- membership function --.

Signed and Sealed this

Twenty-seventh Day of April, 2004

JON W. DUDAS
*Acting Director of the United States Patent and Trademark Office*